US010290397B2

(12) United States Patent
Mayama et al.

(10) Patent No.: US 10,290,397 B2
(45) Date of Patent: May 14, 2019

(54) ELECTRIC WIRE AND METHOD FOR PRODUCING THE SAME, AND MULTI-CORE CABLE AND METHOD FOR PRODUCING THE SAME

(71) Applicant: SUMITOMO ELECTRIC INDUSTRIES, LTD., Osaka-shi, Osaka (JP)

(72) Inventors: Yuhei Mayama, Kanuma (JP); Takaya Kohori, Kanuma (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/975,010

(22) Filed: May 9, 2018

(65) Prior Publication Data

US 2018/0261356 A1 Sep. 13, 2018

Related U.S. Application Data

(63) Continuation of application No. 15/093,167, filed on Apr. 7, 2016, now Pat. No. 9,997,279.

(30) Foreign Application Priority Data

Apr. 8, 2015 (JP) ................................ 2015-079638

(51) Int. Cl.
*H01B 7/29* (2006.01)
*H01B 13/24* (2006.01)
(Continued)

(52) U.S. Cl.
CPC ............. *H01B 7/292* (2013.01); *H01B 3/302* (2013.01); *H01B 7/295* (2013.01); *H01B 13/24* (2013.01); *H01B 3/28* (2013.01); *H01B 7/1875* (2013.01)

(58) Field of Classification Search
USPC ............................................. 174/104, 120 R
See application file for complete search history.

(56) References Cited

U.S. PATENT DOCUMENTS 4,496,215 A * 1/1985 Shaheen ................ G02B 6/255 385/114
4,605,818 A * 8/1986 Arroyo ................ G02B 6/4436 156/54
(Continued)

FOREIGN PATENT DOCUMENTS

CN A-1132766 10/1996
CN 101171315 4/2008
(Continued)

*Primary Examiner* — William H. Mayo, III
*Assistant Examiner* — Krystal Robinson
(74) *Attorney, Agent, or Firm* — Drinker Biddle & Reath LLP

(57) ABSTRACT

The electric wire according to one aspect of the present invention is an electric wire comprising an insulated electric wire and one or more coating layers covering the insulated electric wire, wherein at least one layer of the one or more coating layers is formed from a resin composition containing a thermoplastic polyurethane elastomer and an allophanate crosslinking agent. The electric wire having such a characteristic feature is excellent in abrasion resistance and heat resistance and can be produced at low costs.

10 Claims, 2 Drawing Sheets

(51) Int. Cl.

| | |
|---|---|
| ***H01B 3/30*** | (2006.01) |
| ***H01B 7/295*** | (2006.01) |
| *H01B 3/28* | (2006.01) |
| *H01B 7/18* | (2006.01) |

(56) References Cited

U.S. PATENT DOCUMENTS

| | | | | |
|---|---|---|---|---|
| 5,136,683 | A * | 8/1992 | Aoki | G02B 6/4436 385/100 |
| 5,262,476 | A | 11/1993 | Laughner | |
| 5,358,786 | A * | 10/1994 | Ishikawa | H01B 3/30 174/110 AR |
| 8,479,775 | B2 * | 7/2013 | Swails | F16L 11/088 138/109 |
| 2002/0151647 | A1 * | 10/2002 | Laughner | C08L 23/04 525/63 |
| 2003/0072545 | A1 * | 4/2003 | Kusakari | G02B 6/4432 385/101 |
| 2007/0112143 | A1 * | 5/2007 | Hilmer | C08G 18/0895 525/457 |
| 2007/0119511 | A1 * | 5/2007 | Donohue | A61M 39/08 138/114 |
| 2008/0207846 | A1 | 8/2008 | Henze et al. | |
| 2009/0247684 | A1 * | 10/2009 | Jerschow | B82Y 30/00 524/430 |
| 2010/0105842 | A1 * | 4/2010 | Hilmer | C08G 18/0895 525/452 |

FOREIGN PATENT DOCUMENTS

| | | |
|---|---|---|
| CN | 103173002 | 6/2013 |
| JP | A-2001-161633 | 6/2001 |
| JP | T-2008-544009 | 12/2008 |
| JP | 2013-129759 A | 7/2013 |
| WO | WO 2006/126755 | 11/2006 |

* cited by examiner

ELECTRIC WIRE AND METHOD FOR PRODUCING THE SAME, AND MULTI-CORE CABLE AND METHOD FOR PRODUCING THE SAME

This is a continuation application of copending application Ser. No. 15/093,167, having a filing date of Apr. 7, 2016, which claims the benefit of priority of Japanese Patent Application No. 2015-079638, filed on Apr. 8, 2015, which is incorporated herein by reference. The copending application Ser. No. 15/093,167 is also incorporated by reference herein in its entirety.

CROSS-REFERENCE TO RELATED APPLICATION

The present application claims the benefit of priority of Japanese Patent Application No. 2015-079638, filed on Apr. 8, 2015, which is incorporated herein by reference.

BACKGROUND

Technical Field

The present invention relates to an electric wire and a method for producing the same, and a multi-core cable and a method for producing the same.

Related Art

There is proposed an electric wire in which a coating layer is formed from a resin composition containing a polyurethane and a monomer having an isocyanate group (see JP-A-2013-129759). The monomer can form a three-dimensional crosslinked structure having allophanate bonds and the like which are formed by the reaction of the isocyanate group with a urea bond of the polyurethane.

However, the resin composition containing the polyurethane and the monomer undergoes a crosslinking reaction inside a melting and kneading machine or an extruder before extrusion owing to the heating at the time of kneading and extrusion molding and, as a result, there are not only a concern that moldability and yield at extrusion decreases but also a concern that the extruder is damaged. Therefore, the above-described electric wire is difficult to produce.

SUMMARY

Accordingly, an object of the present invention is to provide an electric wire and a multi-core cable excellent in abrasion resistance and heat resistance and capable of being produced at low costs.

The electric wire according to the first aspect of the invention is an electric wire comprising an insulated electric wire and one or more coating layers covering the insulated electric wire, wherein at least one layer of the one or more coating layers is formed from a resin composition containing a thermoplastic polyurethane elastomer and an allophanate crosslinking agent.

The multi-core cable according to the second aspect of the invention is a multi-core cable comprising a plurality of insulated electric wires and one or more coating layers covering the plurality of insulated electric wire, wherein at least one layer of the one or more coating layers is formed from a resin composition containing a thermoplastic polyurethane elastomer and an allophanate crosslinking agent.

The method for producing an electric wire according to the third aspect of the invention is a method for producing an electric wire comprising an insulated electric wire and one or more coating layers covering the insulated electric wire, the method comprising a step of melting a resin composition containing a thermoplastic polyurethane elastomer and an allophanate crosslinking agent and a step of coating the insulated electric wire with the melted resin composition.

The method for producing a multi-core cable according to the fourth aspect of the invention is a method for producing a multi-core cable comprising a plurality of insulated electric wires and one or more coating layers covering the plurality of insulated electric wires, the method comprising a step of melting a resin composition containing a thermoplastic polyurethane elastomer and an allophanate crosslinking agent and a step of coating wholly the plurality of insulated electric wires with the melted resin composition.

The "insulated electric wire" herein refers to an electric wire comprising one conductor and an insulating layer present outside the one conductor.

The electric wire and the multi-core cable according to the invention are excellent in abrasion resistance and heat resistance and can be produced at low costs.

DETAILED DESCRIPTION

Description of Embodiments of the Invention

Figure 1:
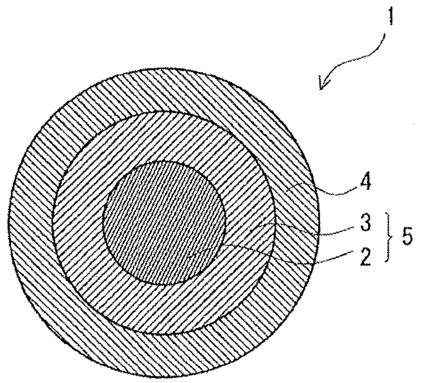
FIG. 1 is a schematic cross-sectional view showing an electric wire according to the first embodiment of the invention.

Since at least one layer of the coating layers is formed from the resin composition containing a thermoplastic polyurethane elastomer, the electric wire according to the first aspect of the invention is excellent in abrasion resistance. Moreover, since the resin composition contains an allophanate crosslinking agent, the thermoplastic polyurethane elastomer contained in the coating layer is crosslinked after the coating layer is extruded and the electric wire exhibits excellent heat resistance. Furthermore, the electric wire can be produced through production steps similar to those for common electric wires and can be produced at low costs because of no necessity of a radiation facility and the like for ionizing radiation.

An outermost layer of the coating layers is preferably formed from a resin composition containing a thermoplastic polyurethane elastomer and an allophanate crosslinking agent. When the outermost layer of the coating layers is thus formed from the resin composition, the abrasion resistance and the heat resistance can be more improved.

The content of the allophanate crosslinking agent to 100 parts by mass of the thermoplastic polyurethane elastomer in the resin composition is preferably 0.4 parts by mass or more and 15 parts by mass or less. When the content of the allophanate crosslinking agent is thus controlled to the above range, the heat resistance can be further improved while maintaining the moldability at extrusion.

The resin composition is preferably a mixture of an A agent containing a thermoplastic polyurethane elastomer and a B agent containing a thermoplastic polyurethane elastomer and a monomer as an allophanate crosslinking agent having an isocyanate group. When the resin composition is thus composed of the mixture of the A agent and the B agent, since melting and extrusion molding can be started from a state that the monomer is dispersed in the thermoplastic polyurethane elastomer to some extent, the monomer can be promptly diffused while suppressing occurrence of local high concentration and, as a result, the crosslinking after extrusion can be more promoted while suppressing crosslinking before extrusion and homogeneity of crosslinking in a longitudinal direction of the electric wire can be improved. That is, the coating layer can be easily and surely molded by melting and extrusion molding. The "mixture" herein refers to physically mixed one by dry blending or the like.

The content of the monomer in the B agent is preferably 15% by mass or more and 65% by mass or less. When the content of the monomer in the B agent is controlled to the above range, the monomer can be more promptly diffused while suppressing the occurrence of local high concentration at the time of melting and extrusion molding and, as a result, the coating layer can be further easily and surely molded by melting and extrusion molding.

The resin composition may further contain a flame retardant. When the resin composition thus further contains the flame retardant, an excellent flame retardant effect can be imparted, in addition to the excellent heat resistance.

The content of the flame retardant to 100 parts by mass of the thermoplastic polyurethane elastomer in the resin composition is preferably 3 parts by mass or more and 90 parts by mass or less. When the content of the flame retardant is thus controlled to the above range, the flame retardant effect can be more improved while maintaining the abrasion resistance.

Moreover, since at least one layer of the coating layers is formed from the resin composition containing a thermoplastic polyurethane elastomer, the multi-core cable according to the second aspect of the invention is excellent in abrasion resistance. Moreover, since the resin composition contains an allophanate crosslinking agent, the thermoplastic polyurethane elastomer contained in the coating layer is crosslinked after extrusion and the multi-core cable exhibits excellent heat resistance. Furthermore, in the case where the multi-core cable contains a core wire with a jacket, by forming the jacket from the resin composition, there is exhibited an excellent effect that melting of the jacket of the core wire or adhesion thereof to the other core wire owing to the heat at extrusion can be prevented at the coating layer extrusion after assembly of the core wires. In addition, the multi-core cable can be produced through production steps similar to those for common multi-core cables and can be produced at low costs because of no necessity of an electron beam irradiation machine and the like.

It is preferred that the coating layers are composed of a plurality of layers and an outermost layer thereof is formed from a resin composition containing a thermoplastic polyurethane elastomer and an allophanate crosslinking agent. When the outermost layer of the coating layers is thus formed from the resin composition containing a thermoplastic polyurethane elastomer and an allophanate crosslinking agent, the abrasion resistance and the heat resistance can be more improved.

It is preferred that the coating layers are composed of a plurality of layers and an inner layer thereof is formed from a resin composition containing a thermoplastic polyurethane elastomer and an allophanate crosslinking agent. When the inner layer of the coating layers is thus formed from the resin composition, desired properties such as a flame retardant effect and mechanical strength can be improved by further forming another layer on the outside.

According to the method for producing an electric wire according to the third aspect of the invention, since it is possible to form a coating layer containing a crosslinked thermoplastic polyurethane elastomer as a main component, an electric wire excellent in abrasion resistance and heat resistance can be easily and surely provided at low costs.

According to the method for producing a multi-core cable according to the fourth aspect of the invention, since it is possible to form a coating layer containing a crosslinked thermoplastic polyurethane elastomer as a main component, a multi-core cable excellent in abrasion resistance and heat resistance can be easily and surely provided at low costs.

DETAILS OF EMBODIMENTS OF THE INVENTION

The following will describe the electric wire and the method for producing the same and the multi-core cable and the method for producing the same according to the embodiments of the invention in detail with reference to Drawings.

First Embodiment

<Electric Wire>

The electric wire 1 of FIG. 1 comprises a conductor 2, an insulating layer 3 which is directly covering the conductor 2, and a protecting layer 4 which is covering the insulating layer 3. The conductor 2 and the insulating layer 3 constitute an insulated electric wire 5. That is, the electric wire 1 comprises the insulated electric wire 5 and the protecting layer 4 as a coating layer covering the insulated electric wire 5.

The cross-sectional shape of the electric wire 1 is not particularly limited but, for example, various shapes such as a round shape, a square shape, and a rectangular shape can be adopted. Moreover, in the case where the cross-sectional shape of the electric wire 1 is a round shape, a lower limit of the average outer diameter may be, for example, 0.3 mm. On the other hand, an upper limit of the average outer diameter may be, for example, 60 mm.

(Conductor)

The conductor 2 is not particularly limited but, for example, a copper wire, a copper alloy wire, an aluminum wire, an aluminum alloy wire, and the like may be mentioned.

The cross-sectional shape of the conductor 2 is not particularly limited but, for example, various shapes such as a round shape, a square shape, and a rectangular shape can be adopted. Moreover, the size of the cross-section of the conductor 2 is not particularly limited but, in the case where the cross-sectional shape of the conductor 2 is a round shape, a lower limit of the average outer diameter may be, for example, 0.1 mm. On the other hand, an upper limit of the average outer diameter may be, for example, 12 mm.

(Insulating Layer)

The insulating layer 3 is formed from an insulating resin material and is laminated on the peripheral surface of the conductor 2 so as to coat the conductor 2. A lower limit of average thickness of the insulating layer 3 is not particularly limited but may be, for example, 0.1 mm. On the other hand, an upper limit of the average thickness is not particularly limited but may be, for example, 10 mm. The "average thickness" herein refers to an average value of thickness measured on arbitrary ten points. Incidentally, also in the case where the term "average thickness" is referred to hereinafter for the other members or the like, the term is similarly defined.

The main component of the insulating resin material is not particularly limited but a polyolefin-based resin is preferred. As the main component of the insulating resin material, for example, there can be used polypropylene, polyethylene, an ethylene-vinyl acetate copolymer, an ethylene-ethyl (met) acrylate copolymer, an ethylene-methyl (met)acrylate copolymer, ethylene-propylene rubber, ethylene acrylic rubber, an ionomer resin, and the like. In addition, there may be also mentioned those obtained by modifying these resins with maleic anhydride or the like and those having an epoxy group, an amino group, or an imido group.

The insulating resin material may contain a flame retardant, a flame retardant aid, an antioxidant, a lubricant, a colorant, a reflection-imparting agent, a shielding agent, a processing stabilizer, a plasticizer, and the like. As the flame retardant, for example, there may be mentioned those exemplified for the resin composition to be mentioned later.

(Protecting Layer)

The protecting layer 4 is an outermost layer of the coating layers and is formed from the resin composition to be mentioned later. A lower limit of average thickness of the protecting layer 4 is not particularly limited but may be, for example, 0.5 mm. An upper limit of the average thickness is not particularly limited but may be, for example, 10 mm.

(Resin Composition)

The resin composition contains a thermoplastic polyurethane elastomer and an allophanate crosslinking agent, may contain a flame retardant as a preferable component, and may contain other components within the range where the effect of the invention is not impaired. Moreover, the resin composition may contain the other resin component such as a thermoplastic polyester elastomer.

[Thermoplastic Polyurethane Elastomer]

The thermoplastic polyurethane elastomer is a resin showing properties as an elastomer among thermoplastic polyurethanes having urethane bonds in the molecular structure and showing plasticity by heating. However, in the molecular structure of the thermoplastic polyurethane elastomer, other than the urethane bonds, other bonds such as a urea bond, a biuret bond, and an allophanate bond may be present. The thermoplastic polyurethane elastomer may be used alone as a single compound or two or more thereof may be used in combination.

The thermoplastic polyurethane is synthesized by a polyaddition reaction of a polyol with a polyisocyanate. The polyol forms a soft segment (flexible component) showing rubber elasticity and the polyisocyanate forms a hard segment (molecule-restraining component) which plays a role of a crosslinking point of crosslinked rubber that prevents plastic deformation. The thermoplastic polyurethane may be one obtained by adding a chain extender or the like in the polyaddition reaction.

Examples of the polyol include polyether polyols, polyester polyols, polylactone polyols, and polycarbonate polyols. The number of the hydroxyl groups in the polyol is preferably 2, 3, or 4, more preferably 2 or 3, and further preferably 2. The polyol may be used alone as a single compound or two or more thereof may be used in combination.

Examples of the polyisocyanate include aromatic polyisocyanates such as 2,4-toluene diisocyanate (2,4-TDI), 2,6-toluene diisocyanate (2,6-TDI), 4,4'-diphenylmethane diisocyanate (MDI), 1,5-diisocyanatonaphthalene (NDI), 3,3'-bitolylene-4,4'-diisocyanate, xylylene diisocyanate, tetramethylxylylene diisocyanate, 1,4-phenylene diisocyanate (PPDI), and 4,4'-methylene-bis(phenylisocyanate);

Alicyclic polyisocyanates such as 4,4'-dicyclohexylmethane diisocyanate, hydrogenated xylylene diisocyanate, and isophorone diisocyanate (IPDI);

Aliphatic polyisocyanates such as hexamethylene diisocyanate (HDI); and the like. The number of the isocyanate groups in the polyisocyanate is preferably 2, 3, or 4, more preferably 2 or 3, and further preferably 2. The polyisocyanate may be used alone as a single compound or two or more thereof may be used in combination.

Examples of the chain extender include polyols, polyamines, and aminoalcohols. The chain extender may be used alone as a single compound or two or more thereof may be used in combination.

As the thermoplastic polyurethane elastomer, from the viewpoint of improving hydrolysis resistance of the protecting layer 4, a polyether-based thermoplastic polyurethane elastomer using a polyether polyol as the polyol is preferred. Moreover, as the thermoplastic polyurethane elastomer, from the viewpoint of improving mechanical strength of the protecting layer 4, a polyester-based thermoplastic polyurethane elastomer using a polyester polyol as the polyol is also preferred. Furthermore, as the thermoplastic polyurethane elastomer, from the viewpoint of improving hydrolysis resistance and mechanical strength of the protecting layer 4 in well balance, a water-resistant ester-based thermoplastic polyurethane elastomer is also preferred. Incidentally, the water-resistant ester-based thermoplastic polyurethane elastomer is a thermoplastic polyurethane elastomer in which the soft segment is formed from a polyester polyol having a relatively high molecular weight and is excellent in water resistance because the number of the urea bonds is relatively small relative to the molecular weight.

A lower limit of the content of the thermoplastic polyurethane elastomer in the resin composition is preferably 50% by mass, more preferably 55% by mass, and further preferably 60% by mass. On the other hand, an upper limit of the content of the thermoplastic polyurethane elastomer in the resin composition is preferably 99.7% by mass, more preferably 98% by mass, further preferably 95% by mass, and particularly preferably 90% by mass. When the content of the thermoplastic polyurethane elastomer is less than the lower limit, there is a concern that the abrasion resistance and heat resistance of the protecting layer 4 of the electric wire 1 decrease. On the other hand, when the content of the thermoplastic polyurethane elastomer exceeds the upper limit, the content of the allophanate crosslinking agent and the like in the resin composition is insufficient, so that the crosslinking and the like of the thermoplastic polyurethane elastomer after extrusion becomes insufficient and, as a result, there is a concern that the heat resistance and the like of the electric wire 1 decrease.

[Allophanate Crosslinking Agent]

The allophanate crosslinking agent forms a three-dimensional crosslinked structure resulting from an allophanate bond by the reaction with the urea bond of the thermoplastic polyurethane elastomer. However, the allophanate crosslinking agent may form a three-dimensional crosslinked structure resulting from another bond such as a biuret bond. As the allophanate crosslinking agent, for example, a monomer having an isocyanate to be mentioned later and the like may be mentioned.

A lower limit of the content of the allophanate crosslinking agent in the resin composition is preferably 0.4 parts by mass, more preferably 0.55 parts by mass, further preferably 0.9 parts by mass, and particularly preferably 1.5 parts by mass to 100 parts by mass of the thermoplastic polyurethane elastomer. On the other hand, an upper limit of the content of the allophanate crosslinking agent in the resin composition is preferably 15 parts by mass, more preferably 10 parts by mass, further preferably 8 parts by mass, and particularly preferably 6 parts by mass to 100 parts by mass of the thermoplastic polyurethane elastomer. When the content of the allophanate crosslinking agent is less than the lower limit, there is a concern that the crosslinking of the thermoplastic polyurethane elastomer becomes insufficient. On the other hand, when the content of the allophanate crosslinking agent exceeds the upper limit, the crosslinking reaction proceeds before extrusion and, as a result, there is a concern that, for example, extrusion becomes difficult, average outer diameter of the electric wire 1 varies, and the apparatus breaks down.

[Flame Retardant]

The flame retardant imparts a flame retardant effect to the protecting layer 4 formed from the resin composition. As the flame retardant, there may be mentioned halogen-based flame retardants such as bromine-based flame retardants and chlorine-based flame retardants, non-halogen-based flame retardants such as metal hydroxides, nitrogen-based flame retardants, and phosphorus-based flame retardants. The flame retardant may be used alone as a single compound or two or more thereof may be used in combination.

Examples of the bromine-based flame retardants include decabromodiphenylethane.

Examples of the chlorine-based flame retardants include chlorinated paraffin, chlorinated polyethylene, chlorinated polyphenol, and perchloropentacyclodecane.

Examples of the metal hydroxides include magnesium hydroxide and aluminum hydroxide.

Examples of the nitrogen-based flame retardants include melamine cyanurate, triazine, isocyanurate, urea, and guanidine.

Examples of the phosphorus-based flame retardants include phosphinic acid metal salts, phosphaphenanthrene, melamine phosphate, ammonium phosphate, phosphoric acid esters, and polyphosphazene.

The flame retardant is preferably non-halogen-based flame retardants from the viewpoint of reducing environmental burden, more preferably metal hydroxides, nitrogen-based flame retardants, and phosphorus-based flame retardants, and further preferably melamine cyanurate, phosphoric acid esters, and phosphinic acid metal salts.

In the case where the resin composition contains a flame retardant, a lower limit of the content of the flame retardant in the resin composition is, for example, 3 parts by mass, preferably 4 parts by mass, more preferably 5.5 parts by mass, and further preferably 10 parts by mass to 100 parts by mass of the thermoplastic polyurethane elastomer. On the other hand, an upper limit of the content of the flame retardant in the resin composition is preferably 90 parts by mass, more preferably 30 parts by mass, further preferably 20 parts by mass, and particularly preferably 15 parts by mass to 100 parts by mass of the thermoplastic polyurethane elastomer. When the content of the flame retardant is less than the lower limit, there is a concern that the flame retardant effect cannot be sufficiently imparted to the electric wire 1. On the other hand, when the content of the flame retardant exceeds the upper limit, there is a concern that the extrusion moldability of the electric wire 1 is impaired and there is a concern that mechanical properties such as elongation and tensile strength are impaired.

(Thermoplastic Polyester Elastomer)

The thermoplastic polyester elastomer is a resin showing properties as an elastomer among thermoplastic polyesters having ester bonds in the main chain and showing plasticity by heating. When the resin composition further contains the thermoplastic polyester elastomer, durability and chemical resistance of the electric wire 1 can be more improved. As the thermoplastic polyester elastomer, for example, there may be mentioned a block copolymer polyester having a hard segment containing a crystalline hard polyester and a soft segment containing an amorphous soft polyester or polyether. As the hard segment, for example, an aromatic polyester and the like may be mentioned. Moreover, as the soft segment, for example, an aliphatic polyether, an aliphatic polyester, and the like may be mentioned.

In the case where the resin composition contains the thermoplastic polyester elastomer, a lower limit of the content of the thermoplastic polyester elastomer in the resin composition is preferably 20% by mass, more preferably 30% by mass, and further preferably 40% by mass to 100 parts by mass of the thermoplastic polyurethane elastomer. On the other hand, an upper limit of the content of the thermoplastic polyester elastomer is preferably 90% by mass, more preferably 80% by mass, and further preferably 70% by mass to 100 parts by mass of the thermoplastic polyurethane elastomer. When the content of the thermoplastic polyester elastomer is less than the lower limit, there is a concern that the durability and chemical resistance of the electric wire 1 is not sufficiently improved. On the other hand, when the content of the thermoplastic polyester elastomer exceeds the upper limit, the content of the thermoplastic polyurethane elastomer in the resin composition decreases, so that there is a concern that the abrasion resistance and the heat resistance decrease.

[Other Components]

As the other components, for example, a flame retardant aid, an antioxidant, a lubricant, a colorant, a processing stabilizer, a plasticizer, and the like may be mentioned.

The resin composition is preferably a mixture of an A agent containing a thermoplastic polyurethane elastomer and a B agent containing a thermoplastic polyurethane elastomer and a monomer as an allophanate crosslinking agent having an isocyanate group. The resin composition may be a mixture of the A agent, the B agent, and a component other than these.

As shapes of the A agent and the B agent, for example, a pellet shape, a sheet shape, a powder shape, a flake shape, and the like may be mentioned. As the shape of the B agent, a pellet shape is preferred. When the B agent is formed into a pellet shape, the agent is easily mixed with the A agent by dry blending or the like before melting or extrusion molding and also heat history of the A agent can be suppressed to the minimum, so that the properties of the material are hardly impaired. As a result, the monomer can be promptly diffused while suppressing the occurrence of local high concentration at the time of melting and extrusion molding and thus the protecting layer 4 of the electric wire 1 can be further easily and surely molded by melting and extrusion molding.

A lower limit of the content of the B agent in the resin composition is preferably 2.5 parts by mass, more preferably 5 parts by mass, and further preferably 8 parts by mass to 100 parts by mass of the A agent. On the other hand, an upper limit of the content of the B agent in the resin composition is preferably 25 parts by mass, more preferably 15 parts by mass, and further preferably 12 parts by mass to 100 parts by mass of the A agent. When the content of the B agent is less than the lower limit, the crosslinking after extrusion becomes insufficient and, as a result, there is a concern that the heat resistance of the electric wire 1 decreases. Moreover, the mixing of the B agent with the A agent is prone to be insufficient and there is a concern that unevenness in the heat resistance and the like occurs in a longitudinal direction of the electric wire 1. On the other hand, when the content of the B agent exceeds the upper limit, the crosslinking reaction proceeds before extrusion and, as a result, there is a concern that, for example, extrusion moldability of the resin composition decreases, outer diameter of the protecting layer 4 varies, and the apparatus breaks down. Moreover, there is a concern that, for example, dregs at the die portion of an extruding machine is generated and appearance of the protecting layer 4 of the electric wire 1 is deteriorated.

(A Agent)

The A agent contains a thermoplastic polyurethane elastomer. The A agent may contain the aforementioned flame retardant and thermoplastic polyester elastomer and other components within the range where the effect of the invention is not impaired. A lower limit of the content of the thermoplastic polyurethane elastomer in the A agent is preferably 40% by mass, more preferably 55% by mass, and further preferably 60% by mass. When the content of the thermoplastic polyurethane elastomer is less than the lower limit, the content of the thermoplastic polyurethane elastomer in the resin composition is insufficient, so that there is a concern that the abrasion resistance and heat resistance of the protecting layer 4 of the electric wire 1 decrease.

(B Agent)

The B agent contains a thermoplastic polyurethane elastomer and a monomer as an allophanate crosslinking agent having an isocyanate group. Moreover, the B agent may contain the aforementioned flame retardant and thermoplastic polyester elastomer and other components within the range where the effect of the invention is not impaired. Contrarily, the B agent may contain only the thermoplastic polyurethane elastomer and the allophanate crosslinking agent. In this case, the A agent may contain only the thermoplastic polyurethane elastomer or may further contain additives such as the flame retardant and other resins such as the thermoplastic polyester elastomer.

As the thermoplastic polyurethane elastomer contained in the B agent, for example, the same thermoplastic polyurethane elastomers as exemplified on the resin composition may be mentioned. As the thermoplastic polyurethane elastomer contained in the B agent, polyether-based thermoplastic polyurethane elastomers are preferred. Incidentally, the thermoplastic polyurethane elastomer contained in the B agent may be the same as or different from the thermoplastic polyurethane elastomer contained in the A agent.

A lower limit of number-average molecular weight (Mn) of the thermoplastic polyurethane elastomer contained in the B agent is preferably 500, more preferably 1,000, further preferably 1,500, and particularly preferably 1,700. On the other hand, an upper limit of Mn of the thermoplastic polyurethane elastomer contained in the B agent is preferably 4,000, more preferably 3,000, further preferably 2,500, and particularly preferably 2,000. When Mn of the thermoplastic polyurethane elastomer contained in the B agent is less than the lower limit or exceeds the upper limit, the dispersibility in the resin composition decreases and, as a result, there is a concern that the heat resistance of the electric wire 1 decreases.

A lower limit of the content of the thermoplastic polyurethane elastomer in the B agent is preferably 40% by mass, more preferably 55% by mass, and further preferably 60% by mass. On the other hand, an upper limit of the content of the thermoplastic polyurethane elastomer in the B agent is preferably 90% by mass, more preferably 82% by mass, and further preferably 75% by mass. When the content of the thermoplastic polyurethane elastomer is less than the lower limit, there is a concern that mixing by dry blending and molding into a shape such as a pellet become difficult. On the other hand, when the content of the thermoplastic polyurethane elastomer exceeds the upper limit, there is a concern that the content of the monomer in the B agent becomes insufficient.

[Monomer Having Isocyanate Group]

The monomer having an isocyanate group is a compound which has an isocyanate group and functions as an allophanate crosslinking agent. The monomer is preferably dispersed in the thermoplastic polyurethane elastomer contained in the B agent. As the monomer having an isocyanate group, there may be mentioned, for example, the polyisocyanates mentioned above about materials of the thermoplastic polyurethane elastomer. The monomer having an isocyanate group is preferably a monomer having two isocyanate groups, more preferably MDI, IPDI, 2,4-TDI, 2,6-TDI, HDI, PPDI, and NDI, and further preferably MDI.

A lower limit of the content of the monomer having an isocyanate group in the B agent is preferably 15% by mass, more preferably 25% by mass, and further preferably 30% by mass. On the other hand, an upper limit of the content of the monomer having an isocyanate group in the B agent is preferably 60% by mass, more preferably 45% by mass, and further preferably 40% by mass. When the content of the monomer having an isocyanate group is less than the lower limit, the content of the B agent in the resin composition increases and, as a result, there is a concern that mixing by dry blending or the like takes labor and time and thus the costs increase. On the other hand, when the content of the monomer having an isocyanate group exceeds the upper limit, a rapid increase in torque resulting from the proceeding of the crosslinking reaction before melting and extrusion molding is prone to occur and thus there is a concern that the extrusion moldability decreases.

(Flame Retardancy of Electric Wire)

The electric wire 1 preferably passes the horizontal flame-retardant test of JASO D618 Standard. As procedures of the horizontal flame-retardant test, first, an electric wire cut into 300 mm is used as a sample and the sample is fixed in a horizontal state. Then, an end of a reducing flame of a Bunsen burner having a diameter of 10 mm is brought into contact with a lower side of the central part of the sample and the flame is gently removed after the coating layer is burnt. Thereafter, flame-remaining time until the flame goes out is measured and one showing the time of 30 seconds or less is judged as passed, while one showing the time exceeding 30 seconds is judged as rejected.

The electric wire 1 further preferably passes the 45° inclined flame-retardant test of ISO9722 Standard. As procedures of the 45° inclined flame-retardant test, first, an electric wire cut into 600 mm is used as a sample and the sample is fixed in a state inclined at 45° relative to a horizontal plane. Then, a flame of a gas burner is brought into contact with a position of 500 mm below from an upper end of the sample and the contact of the flame is finished when the conductor is exposed or after the passage of a predetermined time (15 seconds in the case where the average cross-sectional area of the conductor is 2.5 $mm^2$ or less or 30 seconds in the case where the average cross-sectional area of the conductor is more than 2.5 $mm^2$). Thereafter, a time from the finish of the contact of the flame until the sample is self-extinguished, and the case where the sample is self-extinguished within 70 seconds and the insulating layer remains 50 mm or more from the upper end of the sample is judged as passed and the case where the sample is not self-extinguished within 70 seconds or the insulating layer does not remain 50 mm or more from the upper end of the sample is judged as rejected.

<Method for Producing Electric Wire>

Next, the method for producing the electric wire 1 will be described. The method for producing the electric wire 1 comprises a step of melting the resin composition (melting step) and a step of coating the insulated electric wire 5 with the melted resin composition (coating step). The method for producing the electric wire 1 preferably further comprises a step of dry-blending individual components to be extruding materials before the melting step (dry-blending step) and/or a step of crosslinking the melted resin composition (crosslinking step).

[Dry-Blending Step]

In the present step, for example, individual components such as the A agent and the B agent to be extruding materials are dry-blended beforehand. As a method of dry blending, for example, a method using a dry blender or a Henschel mixer may be mentioned. By providing the dry-blending step before melt-kneading, dispersibility of the components such as the monomer in the protecting layer 4 of the electric wire 1 can be improved and, as a result, the heat resistance of the electric wire 1 can be more improved. Moreover, local crosslinking in the protecting layer 4 can be suppressed.

[Melting Step]

In the present step, the resin composition is melted. As the method of melting the resin composition, for example, a method of charging the resin composition (in the case of performing the dry-blending step, the obtained dry blend) into an extruder and melting it by heating in the cylinder of the extruder may be mentioned.

[Coating Step]

In the present step, the melted resin composition obtained in the melting step is extruded onto the peripheral surface of the insulating layer 3, i.e., the outside of the insulated electric wire 5, to coat it. A lower limit of the extrusion temperature of the melted resin composition is, for example, 160° C. On the other hand, an upper limit of the extrusion temperature of the melted resin composition is, for example, 250° C. When the extrusion temperature is lower than the lower limit, the resin is not sufficiently melted and there is a concern that productivity of the electric wire 1 is deteriorated. On the other hand, when the extrusion temperature exceeds the upper limit, the crosslinking reaction proceeds in the extruder and there is a concern that the extrusion of the melted resin composition becomes difficult.

[Crosslinking Step]

In the present step, the melted resin composition is crosslinked. As methods for crosslinking the melted resin composition, for example, there may be mentioned a method of heating for promoting the crosslinking and a method of allowing to stand at room temperature at the time of storage, transportation, or the like for spontaneous proceeding of the crosslinking. Incidentally, in the case where storage modulus of the protecting layer 4 at 190° C. is $1.0\times10^6$ Pa or more, it is judged that the thermoplastic polyurethane elastomer is crosslinked.

<Advantages>

Since the main component of the protecting layer 4 is a crosslinked thermoplastic polyurethane elastomer, the electric wire 1 is excellent in the abrasion resistance and the heat resistance. Moreover, since the electric wire 1 can be produced by the production steps similar to those for common electric wires and a radiation facility and the like for ionizing radiation is not necessary, the electric wire can be produced at low costs. Furthermore, in the electric wire 1, desired properties such as electrical properties can be improved by using a suitable material as the insulating resin material.

Second Embodiment

<Multi-Core Cable>

Figure 2:
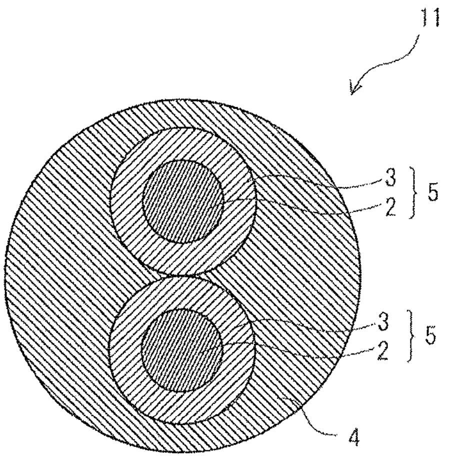
FIG. 2 is a schematic cross-sectional view showing a multi-core cable according to the second embodiment of the invention.

The multi-core cable 11 of FIG. 2 comprises two insulated electric wires 5 and a coating layer 4 directly covering the outside of the two insulated electric wires. That is, the multi-core cable 11 comprises a plurality of insulated electric wires 5 and one coating layer 4 covering the plurality of insulated electric wires 5. Since the protecting layer 4 is the same as that in the first embodiment, the same numeral is attached and the description thereof is omitted. Incidentally, the multi-core cable 11 may comprise three or more insulated electric wires 5.

The insulated electric wire 5 comprises a conductor 2 and an insulating layer 3 directly covering the conductor 2. Since the conductor 2 and the insulating layer 3 are the same as those in the first embodiment, the same numerals are attached and the description there of is omitted.

<Method for Producing Multi-Core Cable>

As a method for producing the multi-core cable 11, for example, there may be mentioned a method of extruding the melted resin composition onto the peripheral surface of the two insulated electric wires 5 in the coating step of the method for producing the electric wire 1 of the first embodiment.

<Advantages>

Since the main component of the protecting layer 4 is a crosslinked thermoplastic polyurethane elastomer, the multi-core cable 11 is excellent in the abrasion resistance and heat resistance. Moreover, the multi-core cable 11 is crosslinkable even when the diameter becomes large resulting from an increase in the number of cores. Therefore, the multi-core cable 11 can be suitably used in use applications where high abrasion resistance and heat resistance are required, for example, various kinds of sensor cables and the like.

Third Embodiment

<Multi-Core Cable>

Figure 3:
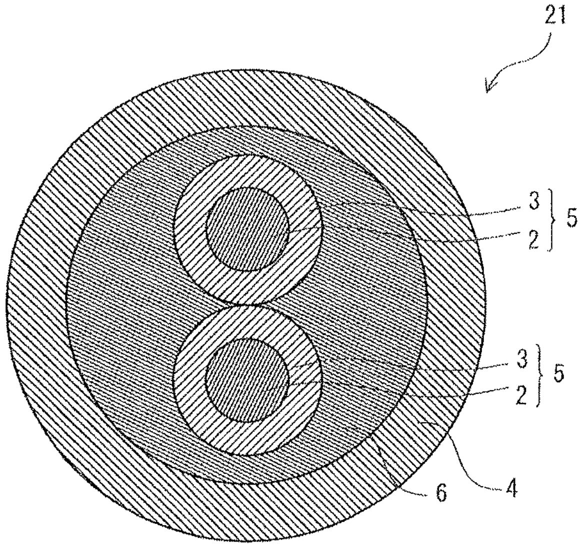
FIG. 3 is a schematic cross-sectional view showing a multi-core cable according to the third embodiment of the invention.

The multi-core cable 21 of FIG. 3 comprises two insulated electric wires 5, an interposing layer 6 directly covering the outside of the two insulated electric wires, and a coating layer 4 covering the interposing layer. Since the insulated electric wire 5 is the same as that in the second embodiment, the same numeral is attached and the description thereof is omitted. Incidentally, the multi-core cable 21 may comprise three or more insulated electric wires 5.

As formation materials of the protecting layer 4 and the interposing layer 6, for example, the resin composition, the insulating resin material, and the like may be mentioned. However, at least either of the protecting layer 4 and the interposing layer 6 is formed from the resin composition. That is, the multi-core cable 21 comprises a plurality of insulated electric wires 5 and a plurality of coating layers covering the plurality of insulated electric wires, and at least either of the protecting layer 4 that is an outermost layer thereof and the interposing layer that is an inner layer thereof is formed from the resin composition. Incidentally, in the multi-core cable 21, both of the protecting layer 4 and the interposing layer 6 may be formed from the resin composition.

<Method for producing Multi-Core Cable>

As a method for producing the multi-core cable 21, for example, there may be mentioned a method of laminating the interposing layer 6 on the peripheral surface of the two insulated electric wires 5 and subsequently laminating the protecting layer 4 on the peripheral surface of the interposing layer 6, the lamination of the interposing layer 6 and/or the protecting layer 4 being performed by coating with the melted resin composition, in the coating step of the method for producing the electric wire 1 of the first embodiment. A specific method of the extrusion molding of the interposing layer 6 may be the same as in the aforementioned coating step.

<Advantages>

Since the main component of at least either of the interposing layer 6 and the protecting layer 4 is a crosslinked thermoplastic polyurethane elastomer, the multi-core cable 21 is excellent in the abrasion resistance and the heat resistance. Moreover, the multi-core cable 21 is crosslinkable even when the diameter becomes large resulting from an increase in the number of cores. Furthermore, in the multi-core cable 21, desired properties can be improved by using suitable formation materials as the formation materials of the interposing layer. Therefore, the multi-core cable 21 can be suitably used in use applications where high abrasion resistance and heat resistance are required, for example, various kinds of sensor cables and the like.

Fourth Embodiment

<Multi-Core Cable>

Figure 4:
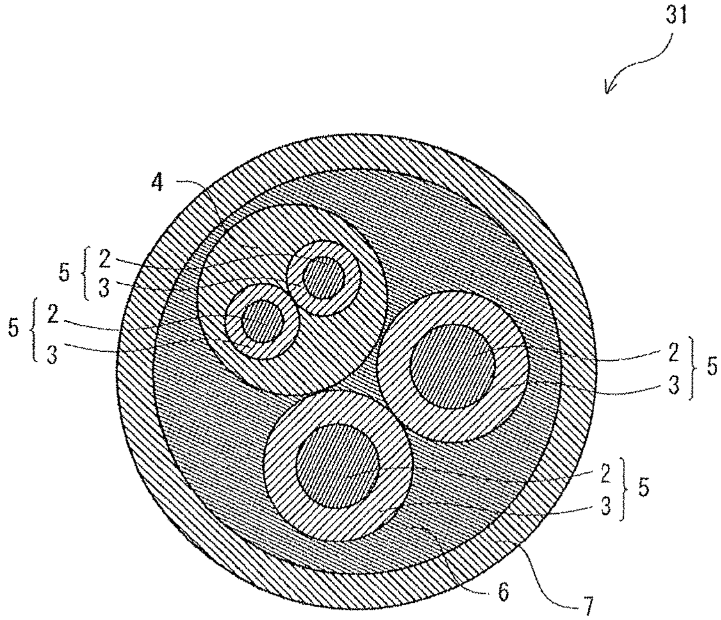
FIG. 4 is a schematic cross-sectional view showing a multi-core cable according to the fourth embodiment of the invention.

The multi-core cable 31 of FIG. 4 comprises a plurality of insulated electric wires 5, a coating layer 4 to be laminated directly on a part of the insulated electric wires 5 of the plurality of insulated electric wires 5, an interposing layer 6 to be laminated directly on the protecting layer 4 and the reaming plurality of insulated electric wires 5, and an outermost layer 7 to be laminated directly on the interposing layer 6. The protecting layer 4 is formed from the resin composition or the insulating resin material and is preferably formed from the resin composition. Since the insulated electric wire 5 is the same as those in the first embodiment, the second embodiment and the third embodiment, the same numeral is attached and the description thereof is omitted.

Incidentally, the insulated electric wire 5 on which the protecting layer 4 is laminated may be one or more of the wires. Moreover, the insulated electric wire 5 on which the interposing layer 6 is directly laminated may be also one or more of the wires.

As formation materials of the outermost layer 7 and the interposing layer 6, for example, the resin composition, the insulating resin material, and the like may be mentioned. However, at least either of the outermost layer 7 and the interposing layer 6 is formed from the resin composition. That is, the multi-core cable 31 comprises a plurality of insulated electric wires 5 and a plurality of coating layers covering the plurality of insulated electric wires, and at least either of the outermost layer 7 and the interposing layer 6 that is an inner layer thereof is formed from the resin composition. Incidentally, in the multi-core cable 31, the protecting layer 4 that is an inner layer is preferably also formed from the resin composition.

<Method for Producing Multi-Core Cable>

As a method for producing the multi-core cable 31, for example, there may be mentioned a method of laminating the protecting layer 4 on the peripheral surfaces of the plurality of insulated electric wires 5, laminating the interposing layer 6 on the peripheral surfaces of the protecting layer and the other plurality of insulated electric wires 5, and laminating the outermost layer 7 on the peripheral surface of the interposing layer 6, the lamination of the protecting layer 4 being performed by coating with the melted resin composition and the lamination of the interposing layer 6 and/or the outermost layer 7 being performed by coating with the melted resin composition, in the coating step of the method for producing the electric wire 1 of the first embodiment. A specific method of the extrusion molding of the interposing layer 6 and the outermost layer 7 can be the same as in the aforementioned coating step.

<Advantages>

Since the main component of at least either of the interposing layer 6 and the outermost layer 7 is a crosslinked thermoplastic polyurethane elastomer, the multi-core cable 31 is excellent in the abrasion resistance and the heat resistance. Moreover, in the multi-core cable 31, the main component of the protecting layer 4 is preferably a crosslinked thermoplastic polyurethane elastomer and, in this case, a trouble that the protecting layer 4 is melted by the heat at extrusion of the interposing layer 6 and the most layer 7 and the shape cannot be maintained can be suppressed. In addition, the multi-core cable 31 is crosslinkable even when the diameter becomes large resulting from an increase in the number of cores. Furthermore, in the multi-core cable 31, desired properties can be improved by using suitable formation materials as the formation materials of the interposing layer 6 and the outermost layer 7. Therefore, the multi-core cable 31 can be suitably used in use applications where high abrasion resistance and heat resistance are required, for example, combinations of various kinds of sensor cables and the like.

Other Embodiments

The embodiments disclosed herein should be construed as being examples in all points and being non-restrictive. The scope of the invention is not limited to the constitution of the above embodiments and it is intended that those shown in claims and all changes within the meanings and scopes equivalent to Claims are included.

The electric wire may comprise two or more insulating layers and two or more protecting layers. In the case where the electric wire comprises two or more protecting layers, the two or more protecting layers may be laminated adjacent to each other or may be laminated through another layer between them.

The multi-core cable may comprise two or more protecting layers and two or more interposing layers. In the case where the multi-core cable comprises two or more protecting layers and two or more interposing layers, the two or more protecting layers or interposing layers may be laminated adjacent to each other or may be laminated through another layer between them.

The multi-core cable may comprise an electric wire where a coaxial wire and a plurality of conductors are collectively coated. Moreover, the multi-core cable may comprise one or more units where a plurality of insulated electric wires are bound. Furthermore, the multi-core cable may have no interposing layer and comprise a plurality of insulated electric wires, a tape such as a resin tape, which is wound on the plurality of insulated electric wires, and a protecting layer that coats the outside of the tape, and the protecting layer may be formed from the resin composition. In addition, the multi-core cable may comprise a collectively shielding layer inside the protecting layer.

The conductor may be formed from a stranded wire where a plurality of metal wires are twisted. In this case, plural kinds of metal wires may be combined. The twist number is generally 7 or more.

The insulated electric wire may have a primer layer directly covering the conductor. As the primer layer, one obtained by crosslinking a crosslinkable resin containing no metal hydroxide, such as ethylene can be suitably used. By providing such a primer layer, a decrease in peeling properties of the insulating layer and the conductor with time is prevented and thus a decrease in efficiency of a wire connecting operation can be prevented.

The electric wire may further comprise an external conductor inside the protecting layer. The external conductor plays a role as grounding or a role as a shield for preventing electrical interference from other circuits. Therefore, the electric wire further comprising the external conductor can be used, for example, as a shield electric wire or a shield cable.

EXAMPLES

The following will further specifically describe the electric wire and the multi-core cable according to one aspect of the present invention with reference to Examples but the invention should not be construed as being limited to the following Production Examples.

[Preparation of Dry Blends No. 1 to No. 11]

An A agent containing a thermoplastic polyurethane elastomer and a B agent containing a thermoplastic polyurethane elastomer and MDI as a monomer having an isocyanate group were dry-blended using a mixer to prepare each of dry blends No. 1 to No. 11. The A agent for the dry blends No. 5 to No. 8 further contains a flame retardant (melamine polyphosphate) and the A agent for the dry blends No. 9 to No. 11 further contains a thermoplastic polyester elastomer. Moreover, for the dry blends No. 4, No. 8, and No. 11, the B agent was not used. The mixing amount of each component was as shown in Table 1. Incidentally, in Table 1, "TPU" indicates a thermoplastic polyurethane elastomer and "TPEE" indicates a thermoplastic polyester elastomer.

TABLE 1

| | | No. 1 | | No. 2 | |
|---|---|---|---|---|---|
| | | Content (parts by mass) | Content to 100 parts of TPU (parts by mass) | Content (parts by mass) | Content to 100 parts of TPU (parts by mass) |
| A agent | TPU | 100 | — | 100 | — |
| | Flame retardant | — | — | — | — |
| B agent | TPU | 2.4 | — | 7 | — |
| | Monomer | 0.6 | 0.6 | 3 | 2.8 |
| | Total | 103 | — | 110 | — |

| | | No. 3 | | No. 4 | |
|---|---|---|---|---|---|
| | | Content (parts by mass) | Content to 100 parts of TPU (parts by mass) | Content (parts by mass) | Content to 100 parts of TPU (parts by mass) |
| A agent | TPU | 100 | — | 100 | — |
| | Flame retardant | — | — | — | — |
| B agent | TPU | 10 | — | 0 | — |
| | Monomer | 10 | 9.1 | 0 | — |
| | Total | 120 | — | 100 | — |

| | | No. 5 | | No. 6 | |
|---|---|---|---|---|---|
| | | Content (parts by mass) | Content to 100 parts of TPU (parts by mass) | Content (parts by mass) | Content to 100 parts of TPU (parts by mass) |
| A agent | TPU | 100 | — | 100 | — |
| | Flame retardant | 6 | 5.6 | 12 | 11.2 |
| B agent | TPU | 7 | — | 7 | — |
| | Monomer | 3 | 2.8 | 3 | 2.8 |
| | Total | 116 | — | 122 | — |

| | | No. 7 | | No. 8 | |
|---|---|---|---|---|---|
| | | Content (parts by mass) | Content to 100 parts of TPU (parts by mass) | Content (parts by mass) | Content to 100 parts of TPU (parts by mass) |
| A agent | TPU | 100 | — | 100 | — |
| | Flame retardant | 18 | 16.8 | 12 | 12.0 |
| B agent | TPU | 7 | — | 0 | — |
| | Monomer | 3 | 2.8 | 0 | 0.0 |
| | Total | 128 | — | 112 | — |

TABLE 1-continued

| | | No. 9 | | No. 10 | |
|---|---|---|---|---|---|
| | | Content (parts by mass) | Content to 100 parts of TPU (parts by mass) | Content (parts by mass) | Content to 100 parts of TPU (parts by mass) |
| A agent | TPU | 100 | — | 100 | — |
| | TPEE | 25 | 23.4 | 80 | 74.8 |
| B agent | TPU | 7 | — | 7 | — |
| | Monomer | 3 | 2.8 | 3 | 2.8 |
| | Total | 135 | | 190 | — |

| | | No. 11 | |
|---|---|---|---|
| | | Content (parts by mass) | Content to 100 parts of TPU (parts by mass) |
| A agent | TPU | 100 | — |
| | TPEE | 80 | 80.0 |
| B agent | TPU | 0 | — |
| | Monomer | 0 | 0.0 |
| | Total | 180 | — |

Production Example 1

The dry blend No. 1 was charged into an extruder and was melt-kneaded in the extruder to produce a resin composition. An insulated electric wire comprising a conductor and an insulating layer directly covering the conductor was prepared and the insulated electric wire was extrusion-coated with a melted resin composition at a temperature of 170° C. or higher and 200° C. or lower on the outer surface to form a protecting layer. The extrusion was set so that average outer diameter of the electric wire became 2.4 mm. As the conductor, a round soft copper wire having an average diameter of 1 mm was used. The insulating layer was a crosslinked polyethylene having an average thickness of 0.5 mm. The thickness of the protecting layer was 0.2 mm. The insulated electric wire extrusion-coated with the resin composition was allowed to stand at room temperature for 1 week to obtain an electric wire of Production Example 1.

Production Examples 2 to 7

Each of electric wires of Production Examples 2 to 7 was obtained in the same manner as in Production Example 1 except that each of the dry blends Nos. 2 to 4 and Nos. 9 to 11 was used instead of the dry blend No. 1.

<Evaluation>

For the electric wires of Production Examples 1 to 7, abrasion resistance, heat resistance, and crosslinking degree were evaluated by the following methods. Table 2 shows evaluation results thereof.

[Abrasion Resistance]

Each of the electric wires of Production Examples 1 to 7 was cut into a length of 750 mm to obtain a test piece. A blade was reciprocated at a rate of 50 times per minute in a length of 10 mm or more in an axial direction against the coating layer of the test piece under room temperature and the number of times of the reciprocation until the blade came into contact with the conductor was measured. A load applied to the blade was 7N. The case where the number of times of the reciprocation until the blade came into contact with the conductor was 200 or more was judged as A (passed) and the case where the number of times was less than 200 was judged as B (rejected).

[Heat Resistance]

Each of the electric wires of Production Examples 1 to 7 was wound on a mandrel having the same diameter six times and, after heated for 30 minutes in a constant-temperature chamber at 200° C., was allowed to cool to room temperature. The case where melting or cracking was observed on appearance was judged as B (rejected) and the other case was judged as A (passed).

[Crosslinking Degree]

Using the coating (protecting layer) of each of the electric wires of Production Examples 1 to 7 as a test piece, a change in elastic modulus at temperature elevation was investigated by measuring it at a frequency of 1 Hz at a temperature elevation rate of 5° C./minute using a DMS (dynamic viscoelasticity) measuring apparatus. As for the crosslinking degree, the case where storage modulus at 190° C. was $1.0\times10^6$ Pa or more was judged as A (good) and the case where it was less than $1.0\times10^6$ Pa was judged as B (bad).

TABLE 2

| | Production Example 1 | Production Example 2 | Production Example 3 | Production Example 4 | Production Example 5 | Production Example 6 | Production Example 7 |
|---|---|---|---|---|---|---|---|
| Dry blend | No. 1 | No. 2 | No. 3 | No. 4 | No. 9 | No. 10 | No. 11 |
| Abrasion resistance | A | A | A | A | A | A | A |
| Heat resistance | A | A | A | B | A | A | B |
| Crosslinking degree | A | A | A | B | A | A | B |

As shown in Table 2, in the electric wires of Production Examples 1 to 3, 5, and 6, good results were obtained on the abrasion resistance, the heat resistance, and the crosslinking degree. On the other hand, in the electric wires of Production Examples 4 and 7, good results were obtained on the abrasion resistance but good results were not obtained on the heat resistance and the crosslinking degree.

Production Examples 8 to 11

Each if electric wires of Production Examples 8 to 11 were obtained in the same manner as in Production Example 1 except that each of the dry blends Nos. 5 to 8 were used instead of the dry blend No. 1.

<Evaluation>

For the electric wires of Production Examples 8 to 11, abrasion resistance, heat resistance, crosslinking degree, and flame retardancy (flame retardant effect) were evaluated. Since the measuring methods of the abrasion resistance, the heat resistance, and the crosslinking degree are the same as mentioned above, description thereof is omitted. The flame retardancy was evaluated by the following method. Table 3 shows evaluation results thereof.

[Flame Retardancy]

A horizontal burning test was performed for the electric wires of Production Examples 1 and 8 to 411 in accordance with JASO-D618. In the horizontal burning test, a flame of a Tirrill burner was brought into contact with a lower side of the central part of the horizontally held electric wire at an angle of 20° for 30 seconds. The case where the flame went out within 30 seconds was judged as A (passed) and the case where the flame did not go out for more than 30 seconds was judged as B (rejected).

TABLE 3

| | Production Example 1 | Production Example 8 | Production Example 9 | Production Example 10 | Production Example 11 |
|---|---|---|---|---|---|
| Dry blend | No. 1 | No. 5 | No. 6 | No. 7 | No. 8 |
| Abrasion resistance | A | A | A | A | A |
| Heat resistance | A | A | A | A | B |
| Crosslinking degree | A | A | A | A | B |
| Flame retardancy | B | A | A | A | A |

As shown in Table 3, in the electric wires of Production Examples 8 to 10, good results were obtained on the abrasion resistance, the heat resistance, the crosslinking degree, and the flame retardancy. On the other hand, in the electric wire of Production Example 1, good results were obtained on the abrasion resistance, the heat resistance, and the crosslinking degree but no good result was obtained on the flame retardancy. Moreover, in the electric wire of Production Example 11, good results were obtained on the abrasion resistance and the flame retardancy but good results were not obtained on the heat resistance and the crosslinking degree.

Production Examples 12 to 18

Each of the dry blends Nos. 1 to 4 and Nos. 9 to 11 was charged into an extruder and was melt-kneaded in the extruder to produce a resin composition. The resin composition was extruded on one obtained by twisting two insulated electric wires at a temperature of 170° C. or higher and 200° C. or lower. The extrusion was set so that average outer diameter of a multi-core cable became 4 mm. The multi-core cable resulting from extrusion coating with the resin composition was allowed to stand at room temperature for 1 week to obtain each of multi-core cables of Production Examples 12 to 18.

<Evaluation>

For the multi-core cables of Production Examples 12 to 18, abrasion resistance, heat resistance, crosslinking degree, and mold processability were evaluated. Since the measuring methods of the abrasion resistance, the heat resistance, and the crosslinking degree are the same as mentioned above, description thereof is omitted. The mold processability was evaluated by the following method. Table 4 shows evaluation results thereof.

[Mold Processability]

A mold was provided around each of the multi-core cables of Production Examples 12 to 18 and a PBT resin composition was injection-molded to form a PBT resin layer having a length of 10 mm and an average thickness of 30 mm around the multi-core cable in close contact. After the whole was allowed to cool to room temperature, the mold was removed and the portion which had been covered by the PBT resin layer was cut. The cut surface was observed on an electron microscope, and the case where no bubbles are present is judged as A (good) and the case where bubbles are present between the protecting layer and the PBT resin layer is judged as B (bad).

TABLE 4

| | Production Example 12 | Production Example 13 | Production Example 14 | Production Example 15 | Production Example 16 | Production Example 17 | Production Example 18 |
|---|---|---|---|---|---|---|---|
| Dry blend | No. 1 | No. 2 | No. 3 | No. 4 | No. 9 | No. 10 | No. 11 |
| Abrasion resistance | A | A | A | A | A | A | A |
| Heat resistance | A | A | A | B | A | A | B |
| Crosslinking degree | A | A | A | B | A | A | B |
| Mold processability | A | A | A | B | A | A | B |

As shown in Table 4, in the multi-core cables of Production Examples 12 to 14, 16, and 17, good results were obtained on the abrasion resistance, the heat resistance, the crosslinking degree, and the mold processability. On the other hand, in the multi-core cables of Production Examples 15 and 18, good results were obtained on the abrasion resistance but good results were not obtained on the heat resistance, the crosslinking degree, and the mold processability.

Production Examples 19 to 25

An ethylene-vinyl acetate copolymer was charged into an extruder and was extruded on one obtained by twisting two insulated electric wires, at a temperature of 170° C. or higher and 200° C. or lower to form an interposing layer. The extrusion was set so that average outer diameter of the interposing layer became 4 mm. Each of the dry blends Nos. 1 to 4 and Nos. 9 to 11 was charged into an extruder and was melt-kneaded in the extruder to produce a resin composition. The resin composition was extruded on the peripheral surface of the aforementioned interposing layer at a temperature of 170° C. or higher and 200° C. or lower. The extrusion was set so that average outer diameter of a multi-core cable became 5 mm. The multi-core cable resulting from extrusion coating with the resin composition was allowed to stand at room temperature for 1 week to obtain each of multi-core cables of Production Examples 19 to 25.

<Evaluation>

For the multi-core cables of Production Examples 19 to 25, abrasion resistance, heat resistance, crosslinking degree, and mold processability were evaluated. The measuring methods of the abrasion resistance, the heat resistance, the crosslinking degree, and the mold processability are the same as mentioned above, description thereof is omitted. Table 5 shows evaluation results thereof.

TABLE 5

| | Production Example 19 | Production Example 20 | Production Example 21 | Production Example 22 | Production Example 23 | Production Example 24 | Production Example 25 |
|---|---|---|---|---|---|---|---|
| Dry blend | No. 1 | No. 2 | No. 3 | No. 4 | No. 9 | No. 10 | No. 11 |
| Abrasion resistance | A | A | A | A | A | A | A |
| Heat resistance | A | A | A | B | A | A | B |
| Crosslinking degree | A | A | A | B | A | A | B |
| Mold processability | A | A | A | B | A | A | B |

As shown in Table 5, in the multi-core cables of Production Examples 19 to 21, 23, and 24, good results were obtained on the abrasion resistance, the heat resistance, the crosslinking degree, and the mold processability. On the other hand, in the multi-core cables of Production Examples 22 and 25, good results were obtained on the abrasion resistance but good results were not obtained on the heat resistance, the crosslinking degree, and the mold processability.

INDUSTRIAL APPLICABILITY

The electric wire and the multi-core cable according to one aspect of the invention are excellent in abrasion resistance and heat resistance and can be produced at low costs.

What is claimed is:

1. An electric wire comprising an insulated electric wire and one or more coating layers covering the insulated electric wire,
- wherein at least one layer of the one or more coating layers is formed from a resin composition containing a thermoplastic polyurethane elastomer and an allophanate crosslinking agent,
- wherein the resin composition is a mixture of:
  - an A agent containing the thermoplastic polyurethane elastomer and
  - a B agent containing the allophanate crosslinking agent and the thermoplastic polyurethane elastomer or a thermoplastic polyester elastomer.

2. The electric wire according to claim 1, wherein the coating layers are composed of a plurality of layers and an outermost layer thereof is formed from a resin composition containing a thermoplastic polyurethane elastomer and an allophanate crosslinking agent.

3. The electric wire according to claim 1, wherein the content of the allophanate crosslinking agent to 100 parts by mass of the thermoplastic polyurethane elastomer in the resin composition is 0.4 parts by mass or more and 15 parts by mass or less.

4. The electric wire according to claim 1, wherein the B agent contains a monomer as an allophanate crosslinking agent having an isocyanate group.

5. The electric wire according to claim 4, wherein the content of the monomer in the B agent is 15% by mass or more and 65% by mass or less.

6. The electric wire according to claim 1, wherein the resin composition further contains a flame retardant.

7. The electric wire according to claim 6, wherein the content of the flame retardant to 100 parts by mass of the thermoplastic polyurethane elastomer in the resin composition is 3 parts by mass or more and 90 parts by mass or less.

8. A multi-core cable comprising a plurality of insulated electric wires and one or more coating layers covering the plurality of insulated electric wires, wherein at least one layer of the one or more coating layers is formed from a resin composition containing a thermoplastic polyurethane elastomer and an allophanate crosslinking agent, wherein the resin composition is a mixture of:

an A agent containing the thermoplastic polyurethane elastomer and a B agent containing the allophanate crosslinking agent and the thermoplastic polyurethane elastomer or a thermoplastic polyester elastomer.

9. The multi-core cable according to claim 8, wherein the coating layers are composed of a plurality of layers and an outermost layer thereof is formed from a resin composition containing a thermoplastic polyurethane elastomer and an allophanate crosslinking agent.

10. The multi-core cable according to claim 8, wherein the coating layers are composed of a plurality of layers and an inner layer thereof is formed from a resin composition containing a thermoplastic polyurethane elastomer and an allophanate crosslinking agent.

* * * * *